United States Patent [19]

Appleyard et al.

[11] 4,136,243
[45] Jan. 23, 1979

[54] OLEFINE POLYMERISATION PROCESS AND CATALYST

[75] Inventors: George D. Appleyard, Hitchin; Anthony D. Caunt, Welwyn Garden City; Michael S. Fortuin, St. Albans; Thomas G. Heggs, Welwyn, all of England

[73] Assignee: Imperial Chemical Industries Limited, London, England

[21] Appl. No.: 529,585

[22] Filed: Dec. 4, 1974

[30] Foreign Application Priority Data

Dec. 4, 1973 [GB] United Kingdom ............... 56168/73
Mar. 28, 1974 [GB] United Kingdom ............... 13741/74

[51] Int. Cl.$^2$ .......................... C08F 4/66; C08F 10/06
[52] U.S. Cl. .................................. 526/139; 252/429 B; 526/128; 526/140; 526/141; 526/142; 526/351
[58] Field of Search ....................... 252/429 B, 429 C; 260/88.2, 93.7, 94.9 C, 94.9 F; 526/141, 139

[56] References Cited

U.S. PATENT DOCUMENTS

| | | | |
|---|---|---|---|
| 2,971,950 | 2/1961 | Natta et al. ..................... | 260/94.9 C |
| 3,219,648 | 11/1965 | Hill .................................. | 260/94.9 C |
| 3,502,634 | 3/1970 | Stedefeder et al. ............. | 260/94.9 C |
| 3,549,608 | 12/1970 | Coover et al. ................... | 260/94.9 C |
| 3,563,970 | 2/1971 | Leicht et al. ..................... | 260/94.9 F |
| 3,600,463 | 8/1971 | Hagemeyer et al. ........... | 260/94.9 F |
| 3,635,930 | 1/1972 | Fodor .............................. | 260/94.9 C |
| 3,752,797 | 8/1973 | Gordon et al. ................. | 260/94.9 C |
| 3,984,350 | 10/1976 | Karayannin et al. ............. | 526/139 |

FOREIGN PATENT DOCUMENTS 2213086 10/1972 Fed. Rep. of Germany.
1369718 7/1964 France.

Primary Examiner—Edward J. Smith
Attorney, Agent, or Firm—Cushman, Darby & Cushman

[57] ABSTRACT

An olefine polymerisation catalyst comprises a titanium trichloride component of high surface area, an organo-metallic component, a Lewis Base component and optionally a polyene. The TiCl$_3$ component which may have a high porosity is conveniently obtained by the reaction of TiCl$_4$ and an organo-aluminium compound, treating the reaction product with a complexing agent and then contacting this product with TiCl$_4$. The organo-metallic component is preferably aluminium triethyl, the Lewis Base component hexamethylphosphoric triamide and the polyene is cycloheptatriene. This system has high polymerisation activity combined with good stereospecificity. Polypropylene can be obtained in high yield thereby giving low catalyst residues and the polymer has a high stiffness modulus.

9 Claims, No Drawings

OLEFINE POLYMERISATION PROCESS AND CATALYST

The present invention relates to the polymerisation of olefine monomeres, and catalysts for use in such polymerisation.

According to the present invention there is provided an olefine polymerisation catalyst comprising (a) a solid $TiCl_3$-containing component having a specific surface area of at least 50 meters$^2$/gm;

(b) at least one organo-metallic compound of aluminium or a non-transition metal of Groups IA or IIA; and (c) at least one Lewis Base Compound.

The catalyst also preferably includes a substituted or unsubstituted polyene for example cyclic polyenes such as cycloheptatriene, cyclooctatriene or cyclooctatetrene.

The solid $TiCl_3$-containing component, which will hereafter be referred to simply as "$TiCl_3$," has a high specific surface area and this is preferably at least 75 meters$^2$/gm and conveniently may be at least 100 meters$^2$/gm, particularly useful results being obtained when the specific surface area is from 150 up to 200 meters$^2$/gm. The term "specific surface area" as used herein is the surface area of one gramme of solid $TiCl_3$, the surface area having been measured using the technique of BS 4359/1. The particles of $TiCl_3$ can have a high porosity for example about 0.10 cm$^3$/gm, or greater. The term "porosity" as used herein is the pore volume of pores of diameter less than 300Å as measured by nitrogen adsorption using the technique described in "Advances in Catalyst," (1957), Vol. IX, pages 143 to 154. The particle diameter may be from 5 to 100 microns. Typically the particles are formed of micro particles which have a diameter of from 0.05 to 1 micron. The micro particles have a large pore volume which contributes to the overall porosity of the particles whilst the space between the micro particles contributes only a relatively minor proportion to the total porosity of the particles. The density of the $TiCl_3$ particles is typically at least 0.6 gm/cm$^3$ and is usually in the range 0.8 to 1.3 gm/cm$^3$.

The $TiCl_3$ component of the catalyst is conveniently prepared by reducing $TiCl_4$ with an organo-aluminium compound, separating the reduced solid from the reaction medium, treating the reduced solid with a complexing agent, separating off any excess complexing agent, contacting the treated solid with $TiCl_4$ and isolating the resulting $TiCl_3$ component.

The various stages of the preparation of the $TiCl_3$ are preferably effected in the presence of a suitable inert hydrocarbon diluent which is conveniently an aliphatic or cycloaliphatic hydrocarbon compound such as hexane, decane or dodecane.

The organo-aluminium compound used is conveniently an aluminum alkyl of formula $AlR'_xX''_{3-x}$ where R' is an alkyl group having 1 to 18 carbon atoms;

X'' is a halogen atom; and x is a number such that $0 < x \leq 0 < x \leq$.

It is preferred that x is from 1.5 up to 2.5 especially from 1.5 up to 2.0. The reaction between the $TiCl_4$ and the organo-aluminium compound is preferably carried out by mixing the $TiCl_4$ and the organo-aluminium compound at a relatively low temperature below about 20° C, very conveniently at 0° C. The time of mixing of the compounds will be dependent on the reaction conditions and the reactants used, however times of 30 minutes to 16 hours, preferably 2 to 10 hours can be used. When the organo-aluminium compound is a dialkyl aluminium halide, or a material including a dialkyl aluminium halide, we prefer to use from 0.6 up to 1.5 moles, for example 1.0 mole of the dialkyl aluminium halide for each mole of titanium tetrachloride. When the addition of the organo-aluminium compound has been completed, the reaction mixture containing the $TiCl_3$ formed may be heated for a period of time, typically up to 4 hours, for example one hour, to a temperature in the range from 20 up to 120° C, preferably from 20 up to 80° C.

The complexing agent is one which is capable of forming complexes with one or more of the components of the reduced solid. Typical complexing agents are organic compounds containing one or more atoms or groups which have one or several free electron pairs capable of co-ordination with one of the constituents of the reduced solid. Such compounds conveniently include a non-metallic element of group V or VI of the Periodic Table, for example ethers, thioethers, thiols, phosphines and amines. It is particularly preferred to use as complexing agents ethers, thioethers and thiols of the formulae:

where R'' and R''' which may be the same or different are hydrocarbyl groups having from 1 to 15 carbon atoms. We have found that the ethers, especially those wherein each hydrocarbyl group is an alkyl group containing from 4 to 10 carbon atoms, or particularly 4 to 6 carbon atoms, such as di-n-butyl ether or diiso-amyl ether, give particularly useful forms of $TiCl_3$. The amount of complexing agent used will be dependent on the particular compound used but, in general, for each mole of $TiCl_3$ which is present in the reduced solid, there is used at least 0.4 moles and preferably 0.8 moles, for example 1.0 mole, of the complexing agent. It is possible to use large proportions of the complexing agent, but no significant improvement in the catalyst properties are achieved when using proportions in excess of 3 moles of complexing agent for each mole of $TiCl_3$.

The treated solid is finally contacted with $TiCl_4$, this contacting being effected at a temperature of up to 100° C, particularly from 40° C up to 80° C. The contacting with $TiCl_4$ can be carried out in pure $TiCl_4$ or in a solution of $TiCl_4$ in a hydrocarbon medium, the concentration of $TiCl_4$ preferably being from 20 up to 40% by volume.

The quantity of $TiCl_4$ used should be at least 0.1 moles, and is preferably at least 1.0 mole, for each mole of $TiCl_3$ present in the treated solid. The reaction of the treated solid with the $TiCl_4$ is dependent on temperature of contacting and amount and concentration of $TiCl_4$, but is generally between 30 minutes and 4 hours, preferably 1 to 3 hours.

Thus, a preferred form of $TiCl_3$ is prepared by mixing together $TiCl_4$ and an organo-aluminium compound of formula

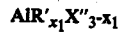

at a temperature not exceeding 20° C, heating the reaction mixture to a temperature of from 20° C up to 80° C, separating the reduced solid from the reaction medium, treating the reduced solid from the reaction medium, treating the reduced solid with an ether of formula $R^{IV}—O—R^{V}$, separating off any excess ether, contacting the treated solid with TiCl$_4$ and isolating the resulting TiCl$_3$ component, all stages being effected in the presence of an inert hydrocarbon diluent; wherein R' is an alkyl group having 1 to 18 carbon atoms;
X'' is a halogen atom;
$R^{IV}$ and $R^{V}$ can be the same or different and are alkyl groups containing 4 to 6 carbon atoms; and
$x_1$ is from 1.5 up to 2.0.

It will be appreciated that the TiCl$_3$ as prepared in accordance with the foregoing procedure is not pure titanium trichloride but also includes other materials complexed with the titanium trichloride, such other materials including aluminium halides and hydrocarbyl aluminium halides and residual amounts of the complexing agent.

The organo-metallic compound which is component b) of the catalyst may be a Grignard reagent which is substantially ether free, or Mg(C$_6$H$_5$)$_2$. Alternatively the organo-metallic compound may be complex of an organo-aluminium compound and an organo-metallic compound of a metal of Groups IA or IIA, such as, for example Mg(AlEt$_4$)$_2$ or a lithium aluminium tetraalkyl. It is preferred to use an organo-aluminium compound such as an aluminium hydrocarbyl sulphate, or an aluminium hydrocarbyloxyhydrocarbyl or particularly an organo-aluminium compound of the formula AlR$_2$X where R is a hydrocarbyl group and X is a hydrocarbyl group or a hydrogen or halogen atom. If desired a mixture of organo-aluminium compounds may be used such as a mixture of an aluminium trihydrocarbyl and a dihydrocarbyl aluminium halide, for example a mixture of triethyl aluminium and diethyl aluminium chloride. Very conveniently component b) of the catalyst is a halogen-free compound, particularly an aluminium trihydrocarbyl compound such as an aluminium trialkyl for example aluminium triethyl.

The Lewis Base which is component c) of the catalyst can be any Lewis Base which is effective to alter the activity and/or stereospecificity of a Ziegler catalyst system. A wide range of such Lewis Bases have been proposed which have such an effect and these include the amines, particularly the cyclic amines such as pyridine, quinoline, isoquinoline and alkyl substituted derivatives; diamines such as N,N,N',N'-tetramethylethylenediamine; alkanolamines such as N,N-dimethyl-N-ethanolamine; amides; urea and thiourea and the substituted derivatives thereof such as N,N,N',N'-tetramethylurea; orgao-phosphorus compounds including the phosphites, phosphates, phosphines and phosphine oxides, such as triphenyl phosphine oxide, bis(dimethylamino-) ethoxyphosphine oxide and hexamethylphosphoric triamide; ethers; esters such as methylmethacrylate; ketones; alcohols; the sulphur containing analogues of the ethers, esters, ketones and alcohols and organo-silicon compounds such as the silanes and siloxanes. It will be appreciated that the effect of, and the optimum conditions for using, a Lewis Base will depend on the particular Lewis Base selected. Catalyst systems including Lewis Base compounds or complexes including Lewis Base compounds are disclosed, inter alia, in British patent specifications Nos. 803,198; 809,717; 800,998; 896,509; 920,118; 921,954; 933,236; 940,125; 966,025; 969,074; 971,248; 1,013,363; 1,049,723; 1,122,010; 1,150,845 and 1,208,815; Dutch Patent Application 70 15555 and published German Patent Application 2,130,314. Of the Lewis Bases which can be used in the catalyst of the present invention the amines, particularly the diamines such as N,N,N',N'-tetramethylethylenediamine, and the cyclic amines such as pyridine, quinoline and isoquinoline are useful and the organophosphorus compound particularly the organo-phosphine oxide derivatives such as hexamethylphosphoric triamide are especially preferred.

Other Lewis Bases which may very conveniently be used are phosphorus compounds selected from materials of the formulae:

(c1)     $T_{3-n}P(Q)_a(E—Z—G)_n$;

(c2) 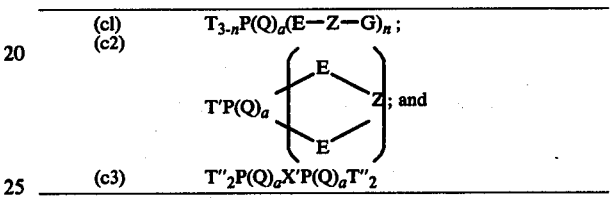

(c3)     $T''_2P(Q)_aX'P(Q)_aT''_2$ wherein
each T is independently halogen, a hydrocarbyl group, a group —NT''''$_2$ or —OT'''', or a heterocyclic group;
T' is T or a group (E—Z—G);
T'' is T' or both the T'' groups which are attached to the same P atom together form a group

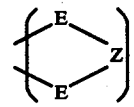

T'''' is a hydrocarbyl group;
X' is —O—, —NT'''''—, —E(CH$_2$)$_m$E— or

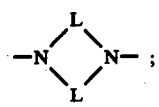

T''''' is a hydrogen or T'''',
L is a bivalent hydrocarbyl radical and each L may be the same or different;
each E is —O—, —S— or —NT''''— and may be the same or different;
G is —OT'''', —ST'''', —NT''''$_2$, —PT''''$_2$ or a heterocyclic ring system whereof the heteroatom is O, S, N or P;
Q is an oxygen or sulphur atom;
Z is a bivalent hydrocarbyl radical such that E and G or E and E are separated by not more than 3 carbon atoms;
each a is independently zero or 1;
m is a positive integer, and
n is 1, 2 or 3.

In the phosphorus compounds of the type (c1), (c2) and (c3), the groups T and T'' attached to a given phosphorus atom are conveniently the same. In compound (c3) it is particularly convenient if all the groups T'' are the same. The groups T, T' and T'' can be alkylamino groups —NT$_2'''$ or alkoxy groups —OT''' wherein T'''
is an alkyl group such as methyl or ethyl. Alternatively,
the groups T, T' and T'' may be heterocyclic groups
such as pyridyl, pyrrolyl, pyrrolidyl or piperidyl and
may be attached to the phosphorus atom through a
carbon or nitrogen atom. If T' or T'' is a group
(E—Z—G), this can be a group derived from, for example an hydroxy ether; an N,N-substituted alkanolamine,
an N,N,N'-substituted diamine or an N,N-substituted
aminothiol group. The group G can be derived from a
heterocyclic compound such as pyridine, quinoline,
isoquinoline, etc. If both of the groups T''' attached to
the same phosphorus atom together form a group

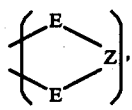

this can be the divalent residue from a glycol, an N-substituted aminoalcohol, an N,N'-substituted diamine or
an N-substituted aminothiol. In compounds (c1) and
(c2) it is preferred that a is one and the group Q is oxygen. Conveniently, but not necessarily, in compounds
(c3) the value of each a is the same, that is both are
either zero or preferably one, and similarly it is preferred that both of the groups Q are the same and are
oxygen.

In compound (c2), it is preferred that at least one of
the groups E is —NT'''—. If a is zero, that is when the
phosphorus is trivalent it is preferred that group T' is
(E—Z—G).

In compund (c3), the group X' can be derived from a
monoamine or an acyclic or cyclic diamine. If the group
X' is of the type —NT''' (CH$_2$)$_m$NT'''—, the group T''' is preferably a hydrocarbyl group such as
methyl and m is preferably 2 or 3. If the group X' is of
the type

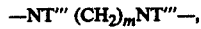

it is preferred that the groups L are both the same and
are alkylene groups of the type —(CH$_2$)$_m$—, particularly ethylene groups when X' is derived from
piperazine. We have obtained satisfactory polymerisation systems using as the phosphorus compound (c3),
materials in which the group X' is

—N(CH$_3$)CH$_2$CH$_2$N(CH$_3$)—;

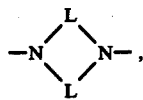

or particularly —O—

In compound (c3) when each a is zero it is preferred
either that X' is derived from an acyclic or cyclic diamine or that at least one T'' is a group (E—Z—G).

Phosphorus compounds of the type (c1), (c2) and (c3)
which may be used as the third component of the catalyst include compounds of the formulae I to XXVIII.

| | |
|---|---|
| [(CH$_3$)$_2$N]$_2$P(O)N(CH$_3$)CH$_2$CH$_2$N(CH$_3$)$_2$ | I |
| (CH$_3$)$_2$NP(O)[N(CH$_3$)CH$_2$CH$_2$N(CH$_3$)$_2$]$_2$ | II |
| [(CH$_3$)$_2$N]$_2$P(O)OCH$_2$CH$_2$N(CH$_3$)$_2$ | III |
| (CH$_3$)$_2$NP(O)[OCH$_2$CH$_2$N(CH$_3$)$_2$]$_2$ | IV |

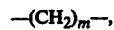

V

VI

VII

VIII

IX

X

| | |
|---|---|
| [(CH$_3$)$_2$N]$_2$P(O)N(CH$_3$)CH$_2$CH$_2$N(CH$_3$)P(O)[N(CH$_3$)$_2$]$_2$ | XI |

XII

| | |
|---|---|
| [(CH$_3$)$_2$N]$_2$P(O)OP(O)[N(CH$_3$)$_2$]$_2$ | XIII |

XIV

XV

| | |
|---|---|
| [(CH$_3$)$_2$N]$_2$P(O)OP(O)(OC$_2$H$_5$)$_2$ | XVI |
| [(C$_2$H$_5$)$_2$N]$_2$P(O)OP(O)[N(CH$_3$)$_2$]$_2$ | XVII |
| [(CH$_3$)$_2$N]$_2$P(S)OP(O)[N(CH$_3$)$_2$]$_2$ | XVIII |

XIX

XX

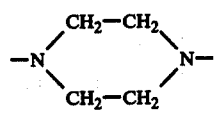

| | |
|---|---|
| P[OCH$_2$CH$_2$N(CH$_3$)$_2$]$_3$ | XXI |
| P[N(CH$_3$)$_2$][OCH$_2$CH$_2$N(CH$_3$)$_2$]$_2$ | XXII |
| P[N(CH$_3$)$_2$]$_2$[OCH$_2$CH$_2$N(CH$_3$)$_2$] | XXIII |

XXIV

XXV

| | |
|---|---|
| P[OCH$_2$CH$_2$OCH$_3$]$_3$ | XXVI |
| P[OC$_2$H$_5$][OCH$_2$CH$_2$OCH$_3$]$_2$ | XXVII |

-continued

P[N(CH₃)₂]₂[N(CH₃)CH₂CH₂N(CH₃)₂]    XXVIII

It is preferred to use compounds of the formula I to XIX, for example those of formulae I, V and XIII.

Alternatively, the Lewis Base compound can be an organo-phosphine oxide derivative wherein at least one of the groups attached to the phosphorus atom is a heterocyclic group containing more than three, preferably five or six, atoms in the ring and attached to the phosphorus atom through either a ring carbon atom or ring heteroatom, catalysts containing such phosphorus compounds being described in our copending British Patent Application No. 7989/73. A further Lewis Base compound which may be used is a phosphine oxide wherein the phosphorus atom is included in an endocyclic ring system, which also includes three other heteroatoms, catalysts containing such phosphorus compounds being described in our copending British Patent Application No. 7988/73.

Catalysts in accordance with the present invention are of high polymerisation activity and stereospecificity. In addition to the three components a), b) and c), the catalyst preferably also includes a substituted or unsubstituted polyene, the presence of which gives a further improvement in the polymerisation characteristics of the catalyst system. The polyene may be an acyclic polyene such as 3-methylheptatriene-(1,4,6) or a cyclic polyene such as cyclooctatriene, cyclooctatetraene or particularly cycloheptatriene or may be a derivative of such polyenes. Such derivatives can be substituted with alkyl or alkoxy groups as in methylcycloheptatriene, dimethylcyclooctatetraene and methoxycycloheptatriene or may be tropylium salts, tropylium complexes, compounds of the type

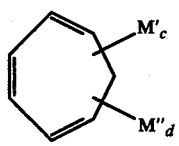

tropolone and its derivatives of the type

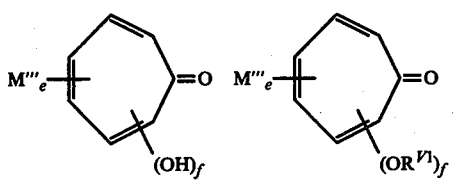

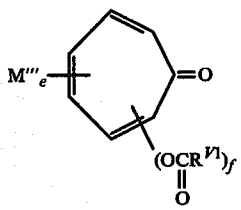

or tropones of the formula

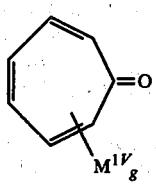

where
M' is hydrogen, halogen, or a hydrocarbyl group, particularly an alkyl group having 1 to 20 carbon atoms, an aryl group, an aralkyl or alkaryl group wherein the alkyl group has 1 to 20 carbon atoms or a condensed benzene ring having two carbon atoms in common with the cycloheptatriene ring;
M" is a monovalent group containing at least one of the elements N, S or O;
M''' is a hydrocarbyl group of 1 to 20 carbon atoms, halogen or M";
$M^{IV}$ is the same as M' and/or M";
$R^{VI}$ is a hydrocarbyl group having 1 to 20 carbon atoms, which may be substituted with an alkoxy- or a hydrocarbylamino-group
c and d are integers wherein $c + d \leq 7$ and usually 2 or less, particularly one;
e and f are integers wherein $e + f \leq 6$; and g is an integer wherein $g \leq 6$.

Tropylium salts and tropylium complexes are salts of cycloheptatriene which may be prepared by the process described in Dokl. akad. Nauk, USSR, 113, page 339 (1957). It will be appreciated that there are many derivatives of the type described including, for example methoxyethyltropylether

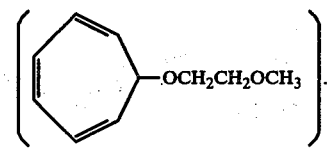

The proportions of the various catalyst components can be varied widely depending both on the materials used and the absolute concentrations of the components. However, in general for each molecular proportion of the TiCl₃ which is component a) of the catalyst, there may be present from 0.1 up to 20 molecular proportions of component b) and from 0.01 up to 10 molecular proportions of component c), with the amount, in moles, of component c) not being greater than the amount, in moles, of component b). It is particularly preferred to use from 0.5 up to 15, and especially 1.0 up to 8 molecular proportions of component b) and from 0.05 up to 5.0 and especially 0.2 up to 2.0 molecular proportions of component c).

If the catalyst also includes a polyene, the molecular proportions of the polyene plus the Lewis Base should preferably, in total, be less than the molecular proportion of component b) (the organo-metallic compound) which is present in the catalyst. For each molecular proportion of component b), the molecular proportion of the polyene is conveniently in the range from 0.01 up to 1.0, especially from 0.05 up to 0.5, for example 0.2.

A preferred catalyst within the present invention comprises a) one molecular proportion of a solid TiCl₃ containing component which is the product of mixing together TiCl₄ and an organo-aluminium compound of formula

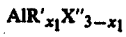

at a temperature not exceeding 20° C, heating the reaction mixture to a temperature of from 20 up to 80° C, separating the reduced solid from the reaction medium, treating the reduced solid with an ether of formula

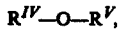

separating off any excess ether, contacting the treated solid with TiCl₄ and isolating the resulting TiCl₃ component, all stages being effected in the presence of an inert hydrocarbon diluent; b) from 0.1 up to 20 molecular proportions of a trihydrocarbyl aluminium compound; c) from 0.1 up to molecular proportions of a Lewis Base compound which is a diamine, a cyclic amine or an organo-phosphorus compound including compounds of the type (c1), (c2) and (c3) and d) from 0.01 up to 1.0 molecular proportions for each mole of component b) of a substituted or unsubstituted polyene which is cyclooctatriene, cyclooctatetrene or cycloheptatriene or alkyl or alkoxyl derivatives thereof; wherein the total amount in moles of components c) and d) does not exceed the amount in moles of component b) and wherein R' is an alkyl group having 1 to 18 carbon atoms;
X" is a halogen atom;
$R^{IV}$ and $R^V$ can be the same or different and are alkyl groups containing 4 to 6 carbon atoms; and
$x_1$ is from 1.5 up to 2.0.

The catalysts of the present invention are particularly suitable for the polymerisation and copolymerisation of mono-α-olefines.

Thus, according to a further aspect of the present invention at least one mono-α-olefine, or a mixture of at least one mono-α-olefine and ethylene, is contacted with a polymerisation catalyst comprising a) a solid TiCl₃-containing component having a specific surface area of at least 50 meters²/gm; b) at least one organoaluminium compound of the formula AlR₂X; c) at least one Lewis Base compound; and optionally d) a substituted or unsubstituted cyclic polyene; wherein R is a hydrocarbyl group; and
X is a hydrocarbyl group, hydrogen or halogen.

Any mono-α-olefine monomer which is capable of being polymerised using a Ziegler catalyst may be polymerised by the process of the present invention. Thus, monomers which can be polymerised by the present process include butene-1, and 4-methylpentene-1 and particularly propylene. The olefines may be copolymerised either together or with ethylene, and such a copolymerisation is conveniently effected using a sequential polymerisation process such as described in British Patents 970, 478; 970, 479 and 1,014,944.

We have found that the process of the present invention can be used for the polymerisation of propylene to give a high yield of polymer relative to the amount of catalyst used and also a relatively low proportion of the undesirable soluble polymer.

As noted, catalysts in accordance with the present invention can be used to prepare a large proportion of polymer for the use of a small quantity of catalyst. It is well known that catalysts of the "Ziegler" type are susceptible to the effects of impurities and the activity and stereospecificity of such catalysts can be affected in a detrimental manner by the presence of small quantities of impurities, particularly oxygen and polar compounds such as water and alcohol in the monomer and/or diluent when used. Thus, for the polymerisation of olefine monomers using Ziegler catalysts, it is known to use pure monomers and diluents. However, when using catalysts in accordance with the present invention, these can be used in smaller proportions than the conventional Ziegler type catalyst and accordingly are more susceptible to any impurities present in the system. Thus, for use with the catalyst of the present invention, we prefer that the monomers, and any diluents, which are of normal commercial purity, are subjected to a further purification procedure.

Any suitable purification treatment can be used and the treatment can be effected in more than one stage if desired. The particular purification treatment used will be dependent on the purity of the starting materials.

Satisfactory purity can be achieved in most cases by passing the monomer (and diluent, if used) through a bed of a material which is capable of absorbing the impurities contained in the monomer of diluent, for example as described in British patent specifications Nos. 1,111,493 and 1,226,659.

Using catalysts in accordance with the present invention, polymerisation can be carried out in the presence or absence of an inert diluent such as a suitably purified paraffinic hydrocarbon. If a diluent is not used, polymerisation can be effected in the liquid phase using excess liquid monomer as the suspension medium for catalyst and polymer product. If the monomer is used in the gaseous phase, polymerisation can be effected using any technique suitable for effecting a gas/solid reaction such as a fluidised bed reactor system.

Polymerisation may be effected either in a batch manner or on a continuous basis. The catalyst components may be introduced into the polymerisation vessel separately but it may be preferred, particularly if polymerisation is being effected on a continuous basis, to mix all the catalyst components together before they are introduced into the polymerisation reactor. Alternatively, not all of the catalyst is added at the beginning of the polymerisation. Thus, a proportion of the catalyst may be added to initiate polymerisation and further quantities of one or more of the catalyst components are added at one or more times during the polymerisation. Conveniently at least 25% of each catalyst component is added to initiate polymerisation, the remaining catalyst components being added during the polymerisation. Since feeding a slurry of TiCl₃ may be inconvenient, it may be preferred that all of the TiCl₃ is added, together with some of each of the other catalyst components, to initiate polymerisation and the rest of the other catalyst components are added during the polymerisation. It is desirable that in any mixing of the catalyst components the TiCl₃ component is not allowed to come into contact with the Lewis Base compound which is component c) in the absence of the organometallic compound which is component b) of the catalyst.

The polymerisation can be effected in the presence of a chain transfer agent such as hydrogen or a zinc dialkyl, in order to control the molecular weight of the product formed.

Using catalysts in accordance with the present invention, particularly catalysts wherein the Lewis Base is a phosphorus compound and which also include a cyclic polyene, we have been able to polymerise propylene to obtain a high yield, relative to the amount of catalyst used, of a polymer having a high flexural modulus which in some cases may be as high as that of commercially available propylene polymers which have been obtained in a lower yield and from which a catalyst removal step is necessary.

Thus, as a further aspect of the present invention there is provided a propylene polymer wherein the titanium and halogen contents of the polymer derived from the residual catalyst in the polymer, are respectively not more than 60 parts per million (ppm) by weight and not more than 250 ppm by weight, and the flexural modulus of the polymer is at least one $GN/m^2$, said polymer being the direct product of polymerisation.

The flexural modulus of the polymer is the modulus as measured by the apparatus described in Polymer Age, March 1970, pages 57 and 58 at 1% skin strain after 60 seconds at 23° C and 50% relative humidity using a test strip as described in Examples 1 to 15. The halogen contained in the polymer will be predominantly, or solely, combined chlorine and the chlorine content is preferably less than 200 ppm, particularly less than 150 ppm, typically from 100 up to 200 ppm.

The titanium content is preferably less than 55 ppm and is typically in the range from 20 up to 55 ppm.

the titanium and chlorine content of the polymer may be determined by any suitable analytical technique and we have found X-ray fluorescence spectrometry to be a particularly convenient technique of analysis.

In general, polymers in accordance with the present invention, particularly propylene homopolymers, when formed into test strips, have a flexural modulus in excess of 1.10 $GN/m^2$, usually at least 1.15 $GN/m^2$. Preferred polymers have a flexural modulus of at least 1.20 $GN/m^2$ and particularly preferred polymers have a modulus of at least 1.30 $GN/m^2$ and especially of at least 1.40 $GN/m^2$, for example as high as 1.45 $GN/m^2$. Thus propylene homopolymers in accordance with the present invention have a flexural modulus in the range from 1.00 up to 1.50, or higher, $GN/m^2$.

Propylene polymers in accordance with the present invention are the direct product of polymerisation and are obtained without subjecting the polymer to any treatment to remove either catalyst residues or undesirable polymeric materials such as stactic polymers, polymers of low crystallinity or crystalline polymers of low molecular weight, from the polymerisation product. Whilst the polymers of the present invention are obtained without an extraction process, the flexural modulus can be increased by extraction with a suitable solvent. Whilst it is possible to use a high boiling aliphatic hydrocarbon such as heptane for such an extraction, we have found that extraction with low boiling solvents which extract only a small proportion, typically between 2 and 4% by weight of the polymer, can produce a significant increase in the modulus of the polymer. Thus, by extraction of 3.7% by weight of a polymer using diethyl ether, the flexural modulus increased from 1.22 $GN/m^2$ up to 1.44 $GN/m^2$.

Polymers in accordance with the present invention have a high molecular weight as indicated by the melt flow index measured according to ASTM Test Method D 1238-70, using Condition N (that is a temperature of 190° C and a weight of 10 kgm). Polymers in accordance with the present invention have a melt flow index of less than 200. Preferred polymers have a melt flow indes of less than 100, particularly less than 50, for example between 5 and 50.

Propylene polymers in accordance with the invention are in the form of powder and this typically has particles which are essentially all in the size range from 400 up to 1200 microns, and the major proportion of the particles, that is at least 50%, and in some cases 90% or more, by weight, are in the range from 500 up to 850 microns. The powder may be used directly or can be subjected to an extrusion process to form laces which are cut into granules. The polymer, either in the form of powder or granules, can be used in the known manner for the production of injection moulded articles or extruded articles, or other products.

Various aspects of the present invention will now be described with reference to the following Examples which are illustrative of the invention. In all the Examples, the surface area of the titanium trichloride-containing component, was at least 50 meters$^2$/gm.

EXAMPLES 1 TO 15

Preparation of TiCl$_3$-containing component (1) Reaction of TiCl$_4$ with organo-aluminium compound 770 ml of a hydrocarbon diluent comprising a mixture of C$_{12}$ isomers (mainly pentamethylheptane) and 385 ml of TiCl$_4$ were introduced, under an atmosphere of nitrogen into a 5 liter reaction vessel and stirred at 250 rpm. The solution of TiCl$_4$ in the diluent was cooled down to 0° C. Over a period of 8 hours, a 25% by weight solution of aluminium ethyl sesquichloride (which contained equal molar proportions of ethyl aluminium dichloride and diethyl aluminium monochloride) in the same diluent, was added to the reactor whilst stirring and maintaining the temperature at 0° C. Sufficient of the sesquichloride solution was added to provide 0.9 moles of diethyl aluminium monochloride for each mole of TiCl$_4$.

After the addition of the aluminium ethyl sesquichloride solution had been completed, the reaction medium, which consists of a suspension of fine particles at 0° C, was stirred for 2 hours. The solid reaction product, a brown coloured material, was separated from the liquid phase by filtration.

(2) Treatment of the solid reaction product with a complexing agent.

A quantity of the solid product obtained in the first stage and containing 1.68 moles of TiCl$_3$ was stirred at 35° for 1 hour, with a solution consisting of 2230 ml hexane and 336 ml diisoamyl ether.

The resulting solid material was separated from the liquid phase without washing.

(3) Reaction of the solid obtained from stage 2) with TiCl$_4$

The solid from stage 2) was suspended in a solution of 662 ml hexane and 442 ml of TiCl$_4$ and stirred for 2 hours at 65°. The liquid phase was then separated and the resulting solid product, the "solid catalyst complex," was washed 4 times with a liter of hexane at 25° C and then once with a liter of hexane at 65° C. The solid catalyst complex was separated from the hexane and dried with pure dry nitrogen.

(4) Properties of the solid catalyst complex

The specific surface area of the material obtained in the manner described was found to be 109 m$^2$/gm. The solid catalyst complex was then used to polymerise propylene as set out in detail hereafter.

Propylene Polymerisation

Polaymerisation was effected using propylene which had been purified by passing gaseous propylene in turn through a column (3 inches diameter, 3 feet length) containing 1/16 inch granules of Alcoa F1 alumina at 50–60° C, and then through a similar column containing BTS catalyst (Cupric oxide reduced to finely divided metallic copper on a magnesium oxide support) at 40–50° C, condensing the issuing gas and passing the liquid propylene through four columns (all 3 inches diameter; two of 3 feet in length, two of 6 feet in length) at 25° C, each containing 1/16 inch pellets of Union Carbide 3A molecular sieves.

This treatment reduced the water content of the monomer from 5–10 ppm by volume to <1 ppm by volume and the oxygen content from 1–2 ppm by volume to <0.5 ppm by volume. The level of inert compounds (nitrogen, ethane, etc.) was unchanged at 0.3% and the level of unsaturated hydrocarbons (allene, methyacetylene, etc.) was unchanged at <1 ppm.

Polymerisation was carried out in a stainless steel autoclave, of total capacity 8 liters, which was fitted with a vertical anchor stirrer. The autoclave was heated to 70° C, evacuated, and the vacuum was released with propylene. The autoclave was then evacuated again and the procedure repeated 5 times. A solution of aluminium triethyl (8 gm millimoles) in n-heptane (6.5 ml) was mixed with a Lewis Base and a cyclic polyene (when used). When the Lewis Base was octamethylpyrophosphoramide benzene (0.84 ml) was also added to dissolve the Lewis Base. This mixture was injected into the above-described autoclave containing propylene gas at 35° C and 2 p.s.i. gauge. A suspension in 1.8 ml of an inert high-boiling hydrocarbon of 1 gram millimole of the titanium trichloride prepared as described above, was injected into the autoclave and then, within 5–10 seconds, 5 liters of liquid propylene were added, the stirrer being operated at 150 rpm. This propylene addition was effected by allowing 5.5 liters of liquid propylene to transfer from a burette at 50° C to the autoclave. Hydrogen (200 gram millimoles) was added and the temperature of the autoclave contents was raised to 65° C over 10 minutes. The hydrogen was commercially available hydrogen (99.99% pure) wich had been further purified by passing through a column (8 inches by 4 feet in length) containing a molecular sieve material (Union Carbide 3A) at 20° C. The hydrogen was stored in the sieve column and drawn off as required. Polymerisation was allowed to proceed at a temperature of 65° C and a pressure of 435 p.s.i. gauge. More hydrogen (20 gram millimoles on each occasion) was added after 10, 25, 45, 80 and 120 minutes from the time of the first hydrogen addition. After polymerisation for 2½ hours, (in some cases polymerisation was terminated after μ hour, and only the first two additions of hydrogen were made), the autoclave was vented over a period of 10 minutes to remove unpolymerised propylene, and free-flowing, grey powder was obtained. The polymerisation conditions are set out in Table 1. In all examples the catalyst contained 1 gm millimole of TiCl₃ and 8 gm millimoles of aluminium triethyl.

TABLE 1

| Example or Comparative Example | Lewis Base Type (a) | mMol | Polyene (mM) Type (b) | mMol | Time (hours) | Conversion gm/mMol TiCl₃ (c) |
|---|---|---|---|---|---|---|
| 1 | HMPT | 0.8 | CHT | 0.8 | 2½ | 1975 |
| 2 | HMPT | 0.8 | — | NIL | 2½ | 950 |
| A | — | NIL | — | NIL | ¾ | 1400 |
| 3 | HMPT | 1.6 | CHT | 1.6 | 2½ | 1480 |
| 4 | PDEPT | 0.8 | — | NIL | 2½ | 1305 |
| 5 | PDEPT | 0.8 | CHT | 0.8 | 2½ | 1325 |
| 6 | OMPA | 0.8 | — | NIL | 2½ | 1390 |
| 7 | OMPA | 0.8 | CHT | 0.8 | 2½ | 1200 |
| 8 | DDDPO | 0.8 | — | NIL | 2½ | 1400 |
| 9 | DDDPO | 0.8 | CHT | 0.8 | 2½ | 1050 |
| 10 | Pic | 0.8 | — | NIL | ¾ | 1300 |
| 11 | Pic | 0.8 | CHT | 0.8 | 2½ | 1410 |
| 12 | TPPO | 0.8 | — | NIL | ¾ | 1700 |
| 13 | TPPO | 0.8 | CHT | 0.8 | 2½ | 1345 |
| 14 | TOTPO | 0.8 | CHT | 0.8 | 2½ | 1500 |
| 15 | OMPA | 0.8 | COT | 0.8 | 2½ | 520 |

Notes to Table 1
a) HMPT is hexamethylphosphoric triamide
pDEPT is N,N,N', N',N''-pentamethyl-N''-β-dimethylamino-ethylphosphoroc triamide (Formula I)
OMPA is octamethylpyrophosphoramide (Formula XIII)
DDDPO is 2-dimethylamino-1,3-dimethyl-1,3,2-diaza-phospholidine-2-oxide (Formula V)
Pic is γ-picoline
TTPO triphenylphosphine oxide

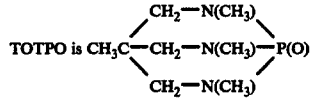

TOTPO is
b) CHT is 1,3,5-cycloheptatriene
COT is cyclooctatetraene
c) Calculated on amount of polymer obtained and quantity of TiCl₃ nominally used.

The properties of the polymers obtained were then determined. The flexural modulus was measured using a cantilever beam apparatus as described in Polymer Age, March 1970, pages 57 and 58. The deformation of a test strip at 1% skin strain after 60 seconds at 23° C and 50% relative humidity was measured. The test strip which had dimensions of approximately 150 × 19 × 1.6 mm was prepared by mixing 23 g of the polymer, which had been dried for 3 hours at 90–100° C in a stream of hot nitrogen, with 0.1% by weight of an antitoxidant ('Topanol' CA), and adding the mixture to a Brabender Plasticiser, at 190° C, 30 rpm and under a load of 10 kg to convert it to a crepe. The crepe was placed within a template, between aluminum foil and pressed by means of an electric Tangye Press at a temperature of 250° C. The pressing was pre-heated for a period of six minutes, under just enough pressure to make the polymer flow across the template, that is with an applied force of about 1 ton. After the pre-heat period, the applied force was raised to 15 tons in 5 ton increments, de-gassing (that is releasing pressure) every 5 tons. After 2 minutes at 15 tons, the press was cooled by means of air and water for 10 minutes or until room temperature was reached.

The plaque was then cut into strips of dimensions 150 × 19 × 1.6 mm. Duplicate strips of each polymer were placed into an annealing oven at 130° C, and after 2 hours at this temperature the heat was switched off and the oven cooled to ambient temperature at 15° C. per hour.

The melt flow index was measured by ASTM Test Method D 1238-70, Condition N (190° C and 10 kgm). The fraction of polymer soluble in boiling heptane was determined by Soxhlet extraction for 16 hours using about 150 mls of heptane and 5 gms of polymer. The Ti contents of the polymers were calculated from the yield of polymer relative to catalyst and the Ti and Cl contents were determined experimentally by X-ray fluorescence spectrometry. The incident X-rays were obtained from a chrome anode. The net intensity ratios of the $Ti_{k\alpha}$ and $Cl_{K\alpha}$ lines were compared with those obtained from samples which had also been chemically analysed. The precision of analysis is ± 1 ppm for Ti and ±5 ppm for Cl.

The results obtained are set out in Table 2.

The $TiCl_3$ component was prepared as generally described in Examples 1 to 14 but with the following modifications:

To a solution of 600 ml of $TiCl_4$ in 2400 ml of hexane maintained at 1° C was added, over a period of 4 hours, 1800 ml of a solution of diethyl aluminum monochloride, in hexane, the solution containing 692 ml of the dietyl aluminium monochloride. The mixture was stirred and maintained at 1° C during the addition. When the addition had been completed, the reaction medium was stirred for 15 minutes and then raised to 65° C within about one hour and maintained for one hour at 65° C whilst stirring. The procedure was then as described except that the amount of solid used was sufficient to provide 3.05 moles of $TiCl_3$ and this was treated with a solution of 440 ml of hexane and 690 ml of diisoamyl ether and the solid product was suspended in a solution of 1300 ml of hexane and 442 ml of $TiCl_4$. The catalyst complex had a specific surface area of 149.6 $m^2$/gm, and the pororosity (pores less than 300 Å diameter) was found to be 0.16 $cm^3$/gm. The mean pore diameter was 40–45 Å.

The polymerisation conditions and the properties of the polymers obtained are set out in Table 3. The polyene used in both cases was 1,3,5-cycloheptatriene. Duplicate samples of the polymers obtained were subjected to an extraction treatment by Soxhlet extraction with boiling diethyl ether (about 200 mls of the ether for

TABLE 2

| Example or Comparative Example | Ti (ppm) Calc. | Ti (ppm) Found | Cl (ppm) (g) Calc. (h) | Cl (ppm) (g) Found | % wt Hot Heptane Soluble Polymer (d) | Flex Mod ($GN/m^2$) (e) | MFI (f) |
|---|---|---|---|---|---|---|---|
| 1 | 24 | 35 | 87.5 | ND | 13.4 | 1.05 | 8 |
| 2 | 50 | 37 | 92.5 | ND | 18.2 | 0.75 | 14 |
| 3 | 32 | 44 | 110 | 150 | 9.2 | 1.28 | 14 |
| 4 | 37 | 40 | 100 | ND | 19.4 | 0.96 | 37 |
| 5 | 36 | 48 | 120 | ND | 9.4 | 1.18 | 12 |
| 6 | 35 | 42 | 105 | ND | 20.6 | 0.88 | 36 |
| 7 | 40 | 54 | 135 | 170 | 7.8 | 1.35 | 22 |
| 8 | 34 | 37 | 92.5 | ND | 19.8 | 0.80 | 9 |
| 9 | 46 | 46 | 115 | 160 | 10.2 | 1.28 | 22 |
| 10 | 37 | 42 | 105 | ND | 34.5 | 0.48 | 31 |
| 11 | 34 | 40 | 100 | ND | 15.5 | 1.15 | 26 |
| 12 | 28 | 35 | 87.5 | ND | 29.8 | 0.61 | 30 |
| 13 | 36 | 42 | 105 | 120 | 11.3 | 1.25 | 24 |
| 14 | 32 | 41 | 102.5 | ND | 10.1 | 1.07 | 5.6 |
| 15 | 92 | 105 | 263 | ND | 6.9 | 1.22 | 29.5 |
| A | 34 | 26 | 65 | ND | 41.5 | 0.39 | 92 |

(d) measured by Soxhlet extraction with boiling heptane for 16 hours.
(e) Measured as indicated using the apparatus described in Polymer Age, March 1970, Page 57 ff.
(f) Measured according to ASTM Method D 1238-70, Condition N.
(g) N.D. means not determined.
(h) 2.5 times the amount of Ti found.

It will be observed that in all cases in which the catalyst also included cycloheptatriene (that is Example 1, 3, 5, 7, 9, 11, 13 and 14), the polymer obtained had a flexural modulus in excess of 1.00 $GN/m^2$ and most case the flexural modulus was 1.15 $GN/m^2$ or greater.

EXAMPLES 16 and 17

The general procedure of Example 1 to 15 was repeated using a different $TiCl_3$ component.

15 gms of polymer) for 16 hours, and test pieces were formed from the combined extracted polymers. Using the polymer of Example 16, a total of 3.7% by weight of polymer was extracted and the flexural modulus increased to 1.44 $GN/m^2$. Using the polymer of Example 17, a total of 2.1% by weight of polymer was extracted and the flexural modulus of the extracted polymer was 1.46 $GN/m^2$.

TABLE 3

| Example No. | Lewis Base (a) | Lewis Base (mMol) | Polyene (mMol) | Time hours | Conv. (gm/Mal) $TiCl_3$ (c) | Ti(ppm) (g) Calc. | Ti(ppm) (g) Found | Cl(ppm) (g) Calc. (h) | Cl(ppm) (g) Found | Hot Heptane Solubles % w/w (d) | Flex Mod $GN/m^2$ (e) | MFI (f) |
|---|---|---|---|---|---|---|---|---|---|---|---|---|
| 16 | HMPT | 0.8 | 0.8 | 2½ | 1300 | 37 | 47 | 117.5 | ND | 9.3 | 1.22 | 19 |

TABLE 3-continued

| Example No. | Lewis Base (a) | (mMol) | Polyene (mMol) | Time hours | Conv. (gm/Mal) TiCl$_3$ (c) | Ti(ppm) (g) Calc. | Found | Cl(ppm) (g) Calc. (h) | Found | Hot Heptane Solubles % w/w (d) | Flex Mod GN/m$^2$ (e) | MFI (f) |
|---|---|---|---|---|---|---|---|---|---|---|---|---|
| 17 | HMPT | 1.6 | 1.6 | 2¼ | 1050 | 46 | 53 | 133.5 | 230 | 5.3 | 1.45 | 22 |

(a) See Table 1
(c)
(d)
(e)
(f) See Table 2
(g)
(h)

Particle size of polymers

The polymers of Examples 7, 9 and 17 were subjected to particle size analysis by sieving. The results obtained are set out in Table 4.

TABLE 4

| Particle size (microns) | Eg 7 (% wt) | Eg 9 (% wt) | Eg 17 (% wt) |
|---|---|---|---|
| <210 | 0.55 | 0.25 | 0.90 |
| 210–300 | 1.3 | 2.15 | 0.80 |
| 300–422 | 6.85 | 1.25 | 0.45 |
| 422–500 | 32.1 | 15.95 | 1.85 |
| 500–850 | 58.65 | 74.75 | 91.90 |
| 850–1180 | 0.95 | 4.30 | 2.25 |
| 1180–1400 | 0.15 | 0.40 | 0.05 |
| 1400–2000 | 0.40 | 1.05 | 1.80 |

EXAMPLES 18 TO 23

A polymerisation flask equipped with efficient stirrer and a water jacket was dried carefully and 1 liter of an inert hydrocarbon diluent having a boiling range of about 170–175° C was introduced. The diluent was evacuated at 60° C purged with nitrogen and evacuated which treatment effectively reduced the water and oxygen contents of the diluent to below 10 ppm by weight. The diluent was then saturated with propylene to one atmosphere pressure. The propylene used was purified as described in Examples 1 to 15. Four millimoles of triethyl-aluminium were introduced followed by the Lewis Base to be tested. After half hour 2 millimoles of TiCl$_3$ were introduced. The pressure in the reaction vessel was maintained at one atmosphere by supply of propylene from a burette. After a period of 2.5 hours from the introduction of the TiCl$_3$ the run was terminated with 10 ml of isopropanol and a sample of supernatant liquid extracted for determining the conventration of soluble polymer. The solid was filtered and washed three times with petrol ether and dried in a vacuum oven at 120° C for an hour. The yield of solid plus calculated soluble polymer equalled within experimental error the propylene lost from the burette.

The results obtained are set out in Table 5.

Comparative examples, indicated by letters, were carried out in a similar manner by omitting the Lewis Base.

TABLE 5

| Ex. or Comparative Ex. (i) | Lewis Base Type (a) | (mMol/l) | Yield of Polymer (gm/ mMol TiCl$_3$) (j) | % Weight of Soluble Polymer (k) |
|---|---|---|---|---|
| 18 | DDDPO | 0.25 | 77 | 6.2 |
| 19 | OMPA | 0.5 | 91 | 5.0 |
| 20 | OMPA | 1 | 47 | 3.4 |
| 21 | PDEPT | 0.5 | 71 | 3.7 |

TABLE 5-continued

| Ex. or Comparative Ex. (i) | Lewis Base Type (a) | (mMol/l) | Yield of Polymer (gm/ mMol TiCl$_3$) (j) | % Weight of Soluble Polymer (k) |
|---|---|---|---|---|
| 22 | HMPT | 0.25 | 65 | 8.9 |
| 23* | HMPT | 2 | 43 | 2.5 |
| B* | — | NIL | 96 | 20.7 |
| C | — | NIL | 127 | 25.5 |

(a) See Table 1
(i) In all the examples and comparative examples except those marked with an asterisk (*) the TiCl$_3$ used was as described in Examples 16 and 17. In the examples marked * the TiCl$_3$ was prepared as described in Examples 1 to 15 with the following exceptions: -The first stage was carried out on a smaller scale using a solution of 640 mls hexane and 150 ml TiCl$_4$ in a 2 litre flask with stirring at about 150 r.p.m. and adding a solution, consisting of 320 ml of hexane, and 175 ml of diethyl aluminium monochloride, the addition being for a period of 8 hours. After separating the solid reaction product from the first stage, this was washed 5 times with 500 ml of dry hexane, the solid being resuspended for each wash. The product was then freed from adsorbed hexane by flushing with nitrogen. The treatment with complexing agent was effected using 1720 ml of hexane and 256 ml of diisoamyl ether. The resulting solid was separated from the liquid phase, washed 5 times with 500 ml of hexane at 25° C and dried with nitrogen. The treatment with TiCl$_4$ was effected using 850 ml of a 40% by volume solution of TiCl$_4$ in hexane. The surface area of material prepared in this manner was 159 m$^2$/gm.
(j) Based on solid polymer only.
(k) % based on total polymer (solid + soluble) formed.

EXAMPLES 24 TO 27

Polymerisations were carried out as in Examples 18 to 23 but using 10 millimoles of diethyl aluminum chloride in place of triethyl aluminum with 5 millimols of TiCl$_3$. The propylene feed contained approximately 0.15 volume percent of hydrogen in order to modify the molecular weight. The results obtained are as set out in Table 6. The TiCl$_3$ used was as described for Examples 16 and 17.

It was found that if the amounts of Lewis Base used were higher than those used in the Examples, there was a reduction in the yield of polymer together with an increase in the proportion of soluble polymer formed.

EXAMPLES 28 to 32

The procedure of Examples 1 to 15 was repeated using the same form of titanium trichloride except that the quantities and method of addition of the aluminium triethyl, cycloheptatriene and hexamethylphosphoric-triamide were varied. In all the experiments a solution of aluminium triethyl, 1,3,5-cycloheptatriene and hexamethylphosphoric triamide in n-heptane was prepared, in the molar ratios of 5:1:1, the concentration of the aluminium triethyl being 0.88 moles/liter of solution.

TABLE 6

| Example or Comparative Example | Lewis Base Type (a) | mMol 1 | MFI (190/10) (f) (g) | Yield of Polymer (gm/mMol) (j) | % Weight of Soluble Polymer (k) |
|---|---|---|---|---|---|
| 23 | OMPA | 0.5 | ND | 53 | 0.3 |
| 24 | DDDPO | 0.5 | 47 | 38 | 0.3 |
| 25 | HMPT | 0.5 | 54 | 38 | 0.3 |
| 26 | HMPT | 1 | ND | 55 | 0.3 |
| D | — | NIL | 37 | 40 | 1.1 |

(a) See Table 1
(f)
(g) See Table 2
(j)
(k) See Table 5.

In Examples 28 and 31, all of the solution containing aluminium triethyl and the other components was added at the start of the polymerisation. In Examples 29 and 32, only part of the aluminium triethyl and the other components was added at the start of the polymerisation, further additions being made 30 minutes, 1 hour, 1.5 hours and 2 hours after the start of the polymerisation. In Example 30, only part of the aluminium triethyl and the other components was added at the start of the polymerisation, further additions being made 1.5 hours and 3 hours after the start of the polymerisation. In Examples 29, 30 and 32, the solution added during the polymerisation had been diluted by the addition of a sufficient quantity of n-heptane to give an aluminium triethyl concentration of 0.117 moles/liter of solution.

The details of the polymerisation process are set out in Table 7, and some characteristics of the polypropylene product are given in Table 8.

TABLE 7

| Example No. | Addition of AlEt₃ solution Before Polyn. (mMol) (1) | During Polyn. (mMol) (1) | Total Reaction Time (hours) | Conversion (gm/mMol) TiCl₃) (c) |
|---|---|---|---|---|
| 28 | 12 | NIL | 2½ | 625 |
| 29 | 4 | 4 × 2 | 2½ | 1680 |
| 30 | 8 | 2 × 2 | 6½ | 1770 |
| 31 | 8 | NIL | 2½ | 1175 |
| 32 | 4 | 4 × 1 | 2½ | 1825 |

(c) As in Table 1
(1) Amounts quoted in respect of quantities of aluminium triethyl, quantities of 1,3,5-cyclo-heptatriene and hexamethylphosphoric triamide both 0.2 of the amount of aluminium triethyl.

TABLE 8

| Example No. | Ti (ppm) Calc. | Ti (ppm) Found | Cl (ppm) Calc. (h) | % Weight Hot Heptane Soluble Polymer (d) | Flex Mod (GN/m²) (e) | MFI (f) |
|---|---|---|---|---|---|---|
| 28 | 77 | 65 | 162.5 | 9.2 | 1.25 | 18.5 |
| 29 | 28 | 36 | 90 | 10.9 | 1.16 | 16.5 |
| 30 | 27 | 35 | 87.5 | 8.9 | 1.25 | 11 |
| 31 | 41 | 49 | 122.5 | 9.7 | 1.26 | 17 |
| 32 | 26 | 27 | 67.5 | 15.8 | 0.92 | 25 |

(d)
(e) As in Table 2
(f)
(h)

EXAMPLES 33 TO 36

The procedure of Examples 1 to 15 was repeated with the following differences. The catalyst system consisted of one gm millimole of the TiCl₃ component of Examples 16 and 17, 12 gm millimoles of diethylaluminium chloride and hexamethylphosphoric triamide in the quantities given in Table 9. 5.1 liters of liquid propylene were transferred from a burette at 42° C and 250 gm millimoles of hydrogen were also added. Ten further additions of hydrogen (20 gm millimoles on each occasion) were made 7, 15, 22, 30, 40, 55, 75, 95, 115 and 135 minutes after the start of the polymerisation. Further details of the polymerisation conditions and the results obtained are given in Table 9.

TABLE 9

| Example or Comparative Example | HMPT (mMol) (a) | Conversion to Solid (gm/mMol TiCl₃) (c) | Ti (ppm) Calc. | Ti (ppm) Found | % Weight Hot Heptane Soluble Polymer (d) | Flex Mod (GN/m²) (e) | MFI (f) |
|---|---|---|---|---|---|---|---|
| E | 0 | 1160 | 40 | 50 | 4.6 | 1.24 | 23 |
| 33 | 0.5 | 1280 | 37 | 40 | 1.8 | 1.43 | 12 |
| 34 | 1.0 | 1410 | 34 | 42 | 2.4 | 1.50 | 17 |
| 35 | 1.5 | 1300 | 37 | 40 | 3.0 | 1.53 | 22 |
| 36 | 2.0 | 1130 | 42 | 50 | 4.9 | 1.42 | 35 |

(a) HMPT is as defined in Table 1
(c) As in Table 1
(d)
(e) As in Table 2.
(f)

EXAMPLES 37 TO 45

Polymerisation was carried out in a steel autoclave of capacity 8 liters fitted with an anchor stirrer/scraper. 400 grammes of dry polypropylene was added while stirring the autoclave at 70° C. The stirrer speed was 150 rpm. The autoclave was evacuated, after half an hour the vacuum was released with propylene, and then the autoclave was re-evacuated. This procedure was repeated a further five times over an hour and a half to leave an atmosphere of propylene. The stirrer was stopped and a solution, in heptane, of aluminium triethyl, Lewis Base and 1,3,5-cycloheptatriene was injected into the autoclave by means of a syringe. The autoclave contents were stirred for 10 minutes, the stirrer was stopped and 2 millimoles of the titanium trichloride material were added. The stirrer was restarted and propylene gas was then admitted to the top of the autoclave from a heated stock vessel containing liquid propylene,. A pressure of 400 psi gauge was established over a period of about 30 minutes. The temperature was maintained at 70° C throughout. Hydrogen was added evenly during the pressurisation stage. Polymerisation was effected at 400 psig and 70° C, and hydrogen was added throughout the polymerisation. After the desired polymerisation time, the propylene supply was switched off, and the autoclave vented to atmospheric pressure. The gas cap was purged with nitrogen and the polymer emptied out. The polymer obtained was a free flowing, greyish powder. The polymerisation conditions are set out in Table 10 and the characteristics of the products obtained are summarised in Table 11.

TABLE 10

| Example No. | Type of TiCl$_3$ (m) | Other Catalyst Components | | | Polymerisation Time (hours) | Hydrogen mole % on propylene (p) | Carrier Polymer Type (q) |
|---|---|---|---|---|---|---|---|
| | | AlEt$_3$ (mMol) | Lewis Base (mMol) (n) | CHT (mMol) (b) | | | |
| 37 | I | 12 | 1.2 | 1.2 | 5.0 | α | A |
| 38 | I | 12 | 2.4 | 2.4 | 5.0 | α | A |
| 39 | I | 12 | 1.2 | 1.2 | 5.0 | 0.5 | A |
| 40 | I | 12 | 1.2 | 1.2 | 4.5 | 1.5 | A |
| 41 | II | 12 | 2.4 | 2.4 | 5.0 | 0.5 | A |
| 42 | II | 12 | 1.2* | 1.2 | 5.0 | 1.0 | A |
| 43 | III | 12 | 1.2 | 1.2 | 2.5 | 0.32 | B |
| 44 | III | 12 | 1.2 | 1.2 | 5.0 | β | B |
| 45 | III | 12 | 1.2 | 1.2 | 2.5 | NIL | B |

(b) See Table 1
(m) I - The TiCl$_3$-containing material was prepared using the procedure of Examples 16 and 17 with the exception that the TiCl$_4$ solution was reacted with 3722 ml of a solution, in hexane, of diethyl aluminium monochloride. The solution contained 692 ml of diethyl aluminium chloride. The TiCl$_4$ treated material was washed five times with hexane, but was not dried.
II- The TiCl$_3$-containing material was obtained by a repeat of the preparation described for Example 23. The surface area was found to be 225,3 m$^2$/gm, and the porosity was found to be 0.22 cm$^3$/gm (pores less than 300 A diameter).
III - The TiCl$_3$-containing material was obtained by a repeat of the preparation described for Examples 16 and 17.
(n) The Lewis Base was hexamethylphosphoric triadmide in all the examples except that marked * in which the Lewis Base was tetramethylethylenediamine.
(p) α - 30 millimoles of hydrogen were introduced during pressurisation, and during the polymerisation, 25 millimoles of hydrogen were added for every 250 ml of liquid propylene evaporated into the autoclave from the stock vessel.
β - 60 millimoles of hydrogen were introduced during pressurisation and, during the polymerisation, 10 millimoles of hydrogen were added for each 200 ml of liquid propylene evaporated into the autoclave from the stock vessel. In the other examples, hydrogen was monitored into the system to maintain the indicated level of hydrogen.
(q) Polymer A had the following characteristics:
   Titanium content   28 ppm (by weight)
   MFI   23
   Flexural Modulus   1.39 GN/m$^2$
   Residual Soluble polymer   4.0% (by weight)
Polymer B had the following characteristics:
   Titanium content   75 ppm (by weight)
   MFI   26
   Flexural Modulus   1.36 GN/m$^2$
   Residual Soluble polymer   3.9% (by weight)

TABLE 11

| Example No. | Ti found (ppm) (r) | | Net Cl (ppm) (r) (g) | | Residual Solubles (% wt) (r) (s) | | MFI (f) (r) | | Total Flexural Modulus (GN/m$^2$) (e) |
|---|---|---|---|---|---|---|---|---|---|
| | Total | Net | Found | Calc (h) | Total | Net | Total | Net | |
| 37 | 59 | 66 | 178 | 165 | 5.7 | 6.1 | 5.8 | 4.1 | 1.44 |
| 38 | 75 | 90 | ND | 225 | 4.1 | 4.1 | 3.9 | 2.2 | 1.61 |
| 39 | 64 | 75 | ND | 188 | 5.3 | 5.7 | 4.9 | 3.1 | 1.43 |
| 40 | 75 | 93 | ND | 233 | 6.2 | 7.0 | 25 | 28 | 1.41 |
| 41 | 76 | 96 | 286 | 240 | 6.6 | 7.6 | 11 | 7.6 | 1.52 |
| 42 | 90 | 113 | ND | 283 | 6.7 | 7.6 | 18 | 16 | 1.34 |
| 43 | 85 | 93 | 315 | 233 | 2.9 | 2.2 | 15 | 9.5 | 1.42 |
| 44 | 87 | 94 | ND | 235 | 6.1 | 7.2 | 11.2 | 7.2 | 1.42 |
| 45 | 68 | 66 | ND | 165 | 7.0 | 7.8 | ~0.1 | ~0.1 | 1.32 |

(e)
(f)
  See Table 2
(g)
(h)
(r) "Total" is the quantity as measured on the total TABLE 11-continued

| Example No. | Ti found (ppm) (r) Total | Ti found (ppm) (r) Net | Net Cl (ppm) (r) (g) Found | Net Cl (ppm) (r) (g) Calc (h) | Residual Solubles (% wt) (r) (s) Total | Residual Solubles (% wt) (r) (s) Net | MFI (f) (r) Total | MFI (f) (r) Net | Total Flexural Modulus (GN/m²) (e) |
|---|---|---|---|---|---|---|---|---|---| product, that is the product including the carrier polymer, "Net" is a calculated value deduced from the known properties of the carrier polymer and the measured value for the total product and represents the value for the polymer formed in the polymerisation.
(s) The proportion of residual soluble polymer was determined by adding 1 gramme of solid polymer to 50 ml of the inert hydrocarbon diluent used in the TiCl₄ reduction stage of the catalyst used in Examples 1 to 15, and heating to 185° C, with stirring, until the polymer had fully dissolved (this took about 10 minutes). The solution was cooled to 60° C and maintained at this temperature, with stirring, for 18 hours. The precipitated polymer was separated by filtration at 60° C, and the proportion of polymer which remained dissolved in the diluent determined by evaporating the solution to dryness.

EXAMPLES 46 TO 48

Polymerisation of propylene was effected in a fluidised bed reactor of volume of 0.13 meter. The reactor was provided with a gas distributor plate at its base.

5 kgm of carrier polymer B (as defined in Table 10) for each run, was heated to 40 –50° C in an evacuated chamber (at about 5 mm pressure) for 1.5 hours, the chamber being intermittently purged with hot propylene vapour, to remove volatile impurities from the polymer.

The carrier polymer was then introduced into the reactor through which propylene was being circulated at 80° C and a pressure of about 200 psig. The pressure was raised to 400 psig and hydrogen was introduced in the amount indicated in Table 12.

A solution, in heptane, of aluminium triethyl, 1,3,5-cycloheptatriene and hexamethylphosphoric triamide in the molecular proportions of 5:1:1, was introduced into the reactor in a quantity as indicated in Table 12. A slurry containing 8 millimoles of TiCl₃ (Type III as defined in Table 10) was introduced to initiate polymerisation which was effected for four hours at 80° C.

The propylene used was purified as described in Examples 1 to 15. The propylene was cooled in a heat exchanger and passed through the gas distributor plate to fluidise the polymer particles.

From the reactor, the propylene was passed to a cyclone, to remove fine polymer particles which were returned to the reactor, and the propylene was then recycled in the manner described, fresh feed propylene being added to the recycle propylene. The propylene vapour was passed through the reactor at a sufficient rate to fluidise the bed of polymer particles.

At the end of four hours, the polymer was discharged from the reactor through an intermediate pressure vessel into a low pressure separation vessel which was stirred and purged with nitrogen to remove unreacted propylene. The results obtained are set out in Table 12.

TABLE 12

| Example No. | Hydrogen (mole % on propylene) (p) | Ti found (ppm) (r) Total | Ti found (ppm) (r) Net | Net Cl (ppm) (r) (g) Found | Net Cl (ppm) (r) (g) Calc (h) | Residual Solubles (% wt) (r) (s) Total | Residual Solubles (% wt) (r) (s) Net | MFI (r) Total | MFI (r) Net | Total Flex Mod (GN/m²) (e) | AlEt₃ (mMol) (t) |
|---|---|---|---|---|---|---|---|---|---|---|---|
| 46 | 0.85 | 43 | 34 | 91 | 85 | 11.3 | 13.4 | 44.0 | 50.0 | 1.20 | 130 |
| 47 | 0.75 | 41 | 31 | 53 | 78 | 10.5 | 12.4 | 35.5 | 39.0 | 1.19 | 120 |
| 48 | 0.64 | 38 | 27 | ND | 68 | 9.6 | 11.2 | 29.0 | 29.5 | 1.16 | 120 |

(e)
(f) See Table 2
(g)
(h)
(p) See Table 10
(r)
See Table 11
(s)
(t) The aluminium triethyl also included 1,3,5-cycloheptatriene and hexamethyl-phosphoric triamide in the relative proportions indicted in the description.

EXAMPLES 49 AND 50

The polymerisation procedure of Examples 1 to 15 was repeated, using, as the TiCl₃-containing components TiCl₃ of Types II and III (as defined in Table 10). The other catalyst components were, aluminium triethyl (8 millimoles), tetramethylethylenediamine (0.8 millimoles) and 1,3,5-cycloheptatriene (0.8 millimoles). The results obtained are set out in Table 13.

TABLE 13

| Example No. | 49 | 50 |
|---|---|---|
| Type of TiCl₃ (m) | III | II |
| Conversion (gm/mMol TiCl₃) (c) | 1300 | 1150 |
| Ti (ppm) Calc | 38 | 42 |
| Ti (ppm) Found | 54 | 61 |
| Cl (ppm) Calc (h) | 135 | 183 |
| MFI (f) | 9.4 | 8.6 |
| Residual Soluble polymer (wt %) (s) | 8.3 | 7.4 |

TABLE 13-continued

| Example No. | 49 | 50 |
|---|---|---|
| Flexural Modulus (e) (GN/m²) | 1.34 | 1.17 |

(c) See Table 1
(e)
(f) See Table 2
(h)
(m) See Table 10
(s) See Table 11

EXAMPLE 51

The procedure of Examples 37 to 45 was repeated using, as the catalyst 2 millimoles of a titanium trichloride component, 16 millimoles of aluminium triethyl, 1.6 millimoles of 1,3,5-cycloheptatriene and 1.6 millimoles of 2-dimethylamino-1,3-dimethyl-1,3,2-diazaphospholidine-2-oxide. The titanium trichloride compound used was obtained using the procedure described in Examples 16 and 17 except that the product was not dried.

The carrier polymer used had a titanium content of 27 ppm (by weight), a melt flow index of 29 and a flexural modulus of 1.40 GN/m².

84 millimoles of hydrogen were added during the pressurisation of the reactor, and, during the polymerisation, hydrogen was added at intervals in amounts of 10 millimoles of hydrogen for each 200 ml of liquid propylene vaporised from the stock tank.

Polymerisation was effected for 5 hours and the product obtained had the following characteristics:

| Conversion | 450 gm/millimole of TiCl$_3$ |
|---|---|
| Total Flexural Modulus | 1.44 GN/m² |
| MFI | 17.5 |
| Calculated Net Ti | 107 ppm (by weight) |

We claim:

1. An olefine polymerisation catalyst comprising
   (a) a solid TiCl$_3$-containing component having a specific surface area of at least 50 metres²/gm;
   (b) at least one organo-metallic compound of aluminum or a non-transition metal of Groups I or IIA; and
   c) at least one Lewis Base compound which is an amine, a diamine or an organophosphorus compound,
   component a) being the product obtained by reducing TiCl$_4$ with an organo-aluminum compound, separating the reduced solid from the reaction medium, treating the reduced solid with a complexing agent which is an ether of the formula R″-O-R‴, where R″ and R‴ may be the same or different and are alkyl groups having from 4 to 6 carbon atoms, separating off any excess complexing agent, contacting the treated solid with TiCl$_4$ and isolating the resulting solid TiCl$_3$-containing component.

2. The catalyst of claim 1 wherein TiCl$_4$ is reduced with a compound of formula AlR′$_x$X″$_{3-x}$ by mixing TiCl$_4$ and the organo-aluminium compound at a temperature below 20° C, and, when the addition of the organo-aluminium compound has been completed, heating the reaction mixture containing the TiCl$_3$ formed to a temperature in the range from 20 up to 80° C, where R′ is an alkyl group having 1 to 18 carbon atoms;
X″ is a halogen atom; and
x is a number such that $0 < x \leq 3$.

3. The catalyst of claim 1 wherein the treated solid is treated with TiCl$_4$ at a temperature of from 40° C up to 80° C.

4. The catalyst of claim 1 wherein component c) is N,N,N′,N′-tetramethylethylenediamine; pyridine; quinoline; isoquinoline; γ-picoline; triphenyl phosphine oxide;

5. The catalyst of claim 1 wherein for each molecular proportion of TiCl$_3$ which is present in the solid TiCl$_3$-containing component which is component a), there is present from 0.1 up to 20 molecular proportions of component b) and from 0.01 up to 10 molecular proportions of component c), with the amount of component c) not being greater than the amount of component b).

6. The catalyst of claim 1 wherein the catalyst also includes a polyene.

7. The catalyst of claim 6 wherein the molecular proportions of the polyene plus component c) are less than the number of molecular proportions of component b), and for each molecular proportion of component b) there is present from 0.01 up to 1.0 molecular proportions of the polyene.

8. A process for the production of an olefine polymer wherein at least one mono-α-olefine, or a mixture of at least one mono-α-olefine and ethylene, is contacted with the olefine polymerisation catalyst of claim 1.

9. The catalyst of claim 6 wherein the polyene is selected from the group consisting of 3-methylheptatriene-(1,4,6), cyclooctatriene, cyclooctatetraene, cycloheptatriene, alkyl- or alkoxy-substituted derivatives thereof, tropylium salts, tropylium complexes, compounds of the type

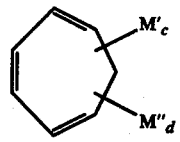

tropolone and its derivatives of the type

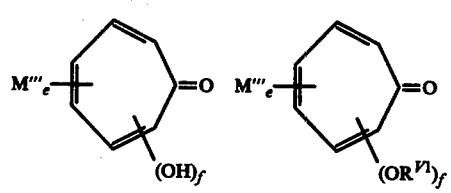

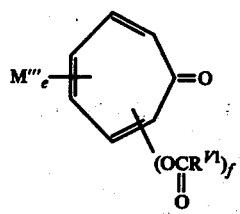

or tropones of the formula

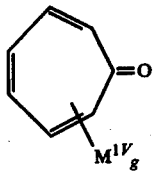

where
M' is hydrogen, halogen, or an alkyl group having 1 to 20 carbon atoms, an aryl group, an aralkyl or alkaryl group wherein the alkyl group has 1 to 20 carbon atoms or a condensed benzene ring having two carbon atoms in common with the cycloheptatriene ring;

M'' is a monovalent group containing at least one of the elements N, S or O;

M''' is a hydrocarbyl group of 1 to 20 carbon atoms, halogen or M'';

$M^{IV}$ is the same as M' and/or M'';

$R^{VI}$ is a hydrocarbyl group having 1 to 20 carbon atoms, which may be substituted with an alkoxy or a hydrocarbyl-amino-group c and d are integers wherein $c + d \leq 7$ e and f are integers wherein $e + f \leq 6$; and g is an integer wherein $g \leq 6$.

* * * * *

UNITED STATES PATENT OFFICE
CERTIFICATE OF CORRECTION

Patent No. 4,136,243  Dated January 23, 1979

Inventor(s) George D. Appleyard: Anthony D. Caunt, Michael S. Fortuin, and Thomas G. Heggs It is certified that error appears in the above-identified patent and that said Letters Patent are hereby corrected as shown below:

IN THE CLAIMS:

Claim 4, column 26, line 9, the words "or hexamethylphosphoric triamide." were omitted and should be inserted so that claim 4 reads:

-- 4. The catalyst of claim 1 wherein component c) is N,N,N',N'-tetramethylethylenediamine; pyridine; quinoline; isoquinoline; γ-picoline; triphenyl phosphine oxide; or hexamethylphosphoric triamide. --

Signed and Sealed this

Sixth Day of November 1979

[SEAL]

Attest:

RUTH C. MASON
Attesting Officer

LUTRELLE F. PARKER
Acting Commissioner of Patents and Trademarks